(12) United States Patent
Godfrey (10) Patent No.: US 7,388,903 B2
(45) Date of Patent: Jun. 17, 2008

(54) ADAPTIVE TRANSMISSION RATE AND FRAGMENTATION THRESHOLD MECHANISM FOR LOCAL AREA NETWORKS

(75) Inventor: Timothy Gordon Godfrey, Overland Park, KS (US)

(73) Assignee: Conexant, Inc., Red Bank, NJ (US)

( * ) Notice: Subject to any disclaimer, the term of this patent is extended or adjusted under 35 U.S.C. 154(b) by 782 days.

(21) Appl. No.: 10/448,184

(22) Filed: May 29, 2003

(65) Prior Publication Data

US 2004/0052307 A1 Mar. 18, 2004

Related U.S. Application Data

(60) Provisional application No. 60/411,565, filed on Sep. 18, 2002.

(51) Int. Cl.
*H04B 1/38* (2006.01)
(52) U.S. Cl. .................. 375/219; 375/222; 370/470
(58) Field of Classification Search ............... 375/219, 375/220, 222, 224, 225, 295, 316; 370/241, 370/252, 470; 709/230, 236
See application file for complete search history.

(56) References Cited

U.S. PATENT DOCUMENTS

| | | | | |
|---|---|---|---|---|
| 4,484,327 A | * | 11/1984 | Hanson | 370/539 |
| 5,287,374 A | * | 2/1994 | Parr | 714/774 |
| 5,579,181 A | * | 11/1996 | Wilkinson | 386/46 |
| 5,719,904 A | * | 2/1998 | Kim | 375/340 |
| 6,233,251 B1 | * | 5/2001 | Kurobe et al. | 370/471 |
| 6,236,647 B1 | * | 5/2001 | Amalfitano | 370/335 |
| 6,434,201 B1 | * | 8/2002 | Ohno | 375/285 |
| 6,636,565 B1 | * | 10/2003 | Kim | 375/240.27 |
| 7,095,719 B1 | * | 8/2006 | Wilhelmsson et al. | 370/252 |
| 7,096,274 B1 | * | 8/2006 | Ci et al. | 709/236 |
| 2002/0056064 A1 | * | 5/2002 | Kidorf et al. | 714/755 |
| 2003/0097623 A1 | * | 5/2003 | Razavilar et al. | 714/704 |

FOREIGN PATENT DOCUMENTS

| | | |
|---|---|---|
| EP | 1 119 153 A1 | 7/2001 |
| WO | WO 01/99384 A2 | 12/2001 |

* cited by examiner

*Primary Examiner*—Chieh M. Fan
*Assistant Examiner*—Naheed Ejaz
(74) *Attorney, Agent, or Firm*—Thomas, Kayden, Horstemeyer & Risley LLP (57) ABSTRACT

An apparatus for adjusting the transmission bit rate and fragmentation threshold of a wireless station in response to transmission errors is disclosed. In particular, the illustrative embodiment of the present invention is based on a wireless station that employs both an IEEE 802.11 radio and a Bluetooth radio, and determines whether transmission errors of the IEEE 802.11 radio are due to fading, or interference from the Bluetooth radio. It will be clear to those skilled in the art how to make and use alternative embodiments of the present invention for protocols other than IEEE 802.11 and Bluetooth, as well as stations that employ wireline or non-RF-wireless transceivers.

29 Claims, 8 Drawing Sheets

ADAPTIVE TRANSMISSION RATE AND FRAGMENTATION THRESHOLD MECHANISM FOR LOCAL AREA NETWORKS

REFERENCE TO RELATED APPLICATIONS

This application claims the benefit of:
U.S. Provisional Patent Application No. 60/411,565, filed on Sep. 18, 2002, entitled "A Mechanism For Collaboration and Interference Prevention Between 802.11 And Bluetooth by Modifying the 802.11 Rate Backoff Algorithm's Behavior,"which is also incorporated by reference.

FIELD OF THE INVENTION

The present invention relates to telecommunications in general, and, more particularly, to a technique for addressing transmission errors due to fading and interference from other radios.

BACKGROUND OF THE INVENTION

Figure 1:
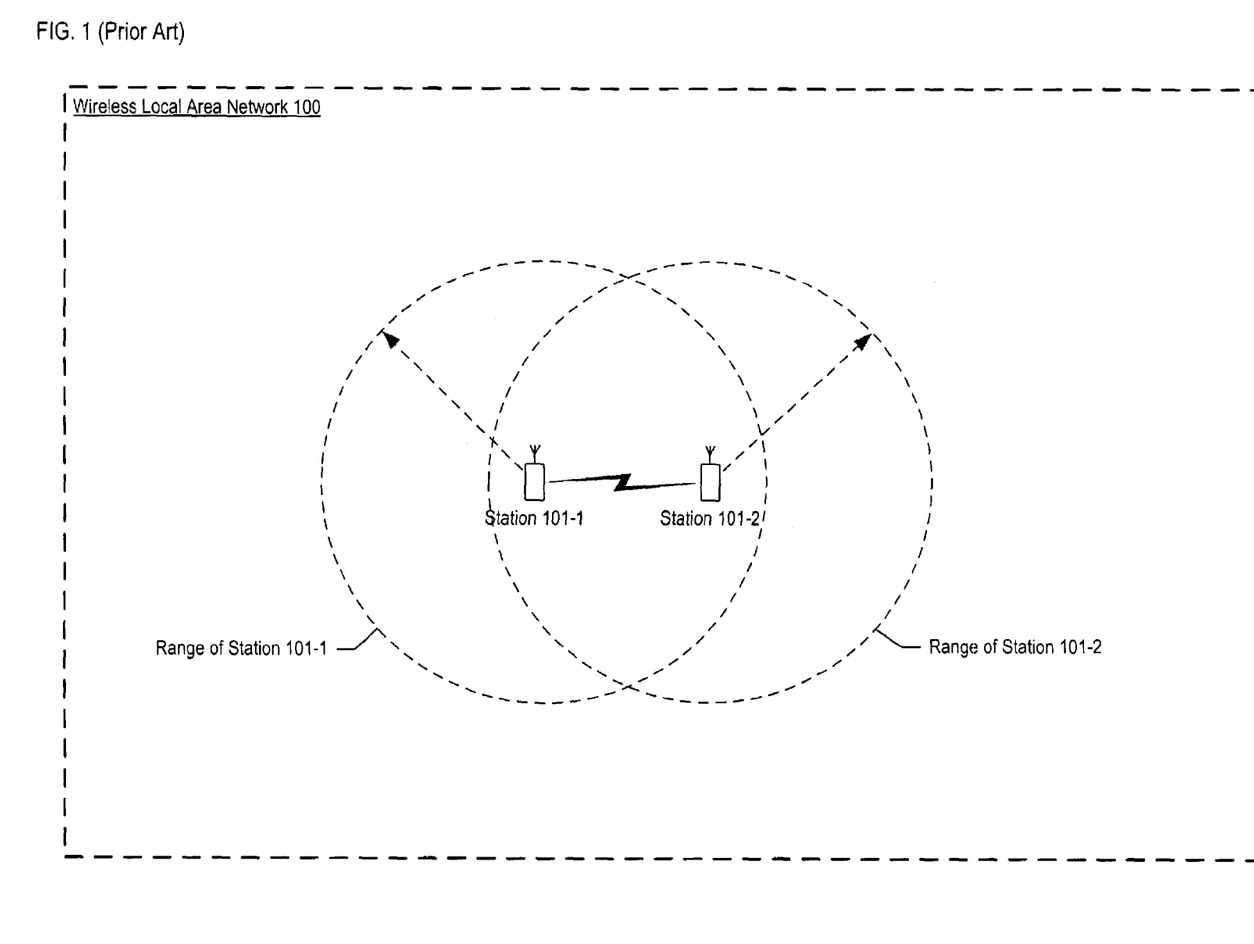
FIG. 1 depicts a schematic diagram of wireless local area network (LAN) 100 in the prior art.

FIG. 1 depicts a schematic diagram of IEEE 802.11-compliant wireless local area network (LAN) 100, which comprises: station 101-1, and station 101-2. As shown in FIG. 1, station 101-1 is within station 101-2's transmission range, and station 101-2 is within station 101-1's transmission range, and thus communications between station 101-1 and station 101-2 occur in typical fashion.

Figure 2:
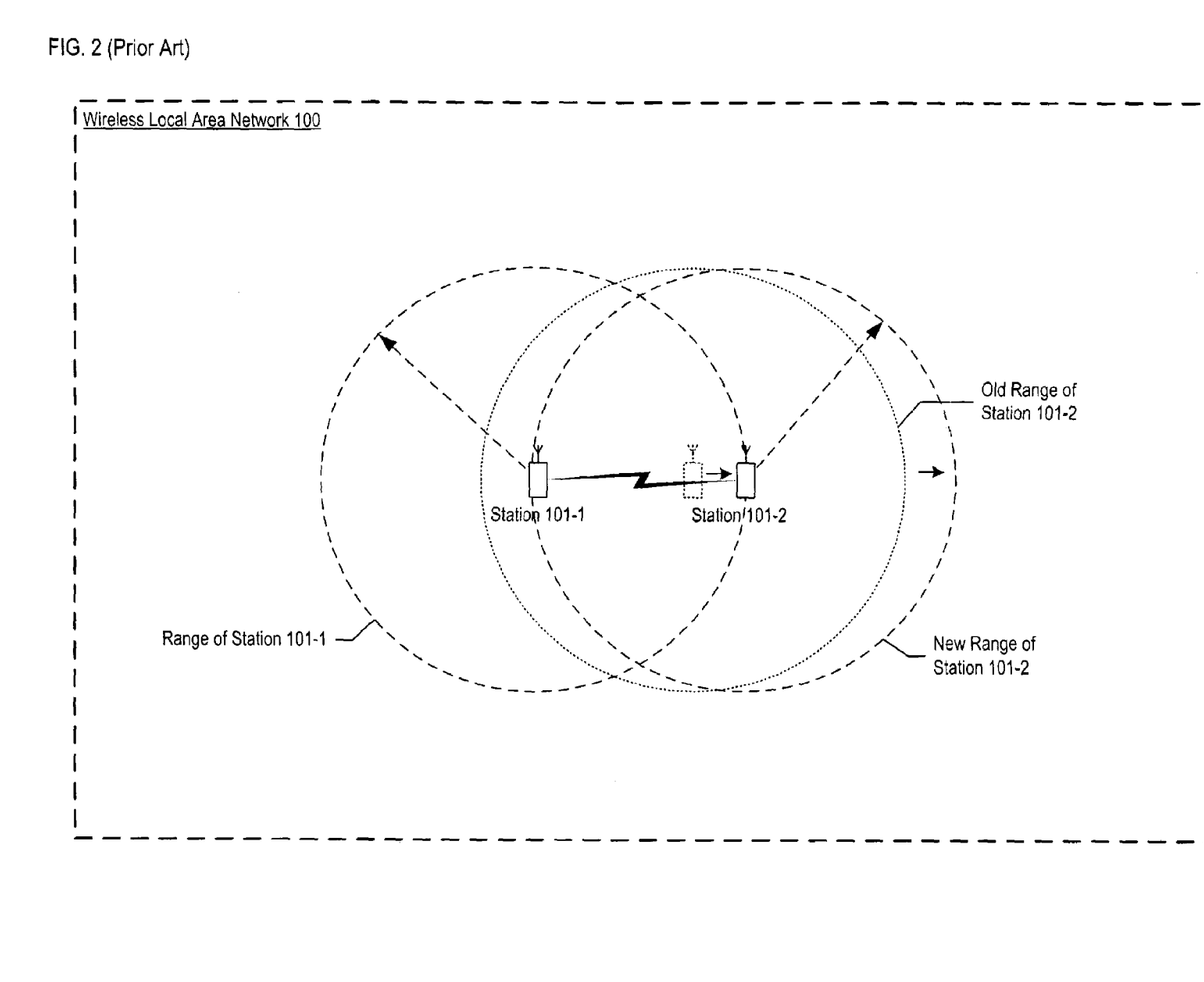
FIG. 2 depicts a schematic diagram of wireless local area network 100, as shown in FIG. 1, in the prior art, in which station 101-2, as shown in FIG. 1, is situated at a new location.

FIG. 2 depicts wireless LAN 100, in which station 101-2 has moved to a new position, while station 101-1 is in the same position as in FIG. 1. As shown in FIG. 2, station 101-1 is now on the fringe of station 101-2's transmission range, and vice versa. Consequently, the number of transmission errors that occur when station 101-1 and station 101-2 communicate typically rises dramatically, thereby decreasing the effective throughput of these communications. This phenomenon is referred to as fading.

Figure 3:
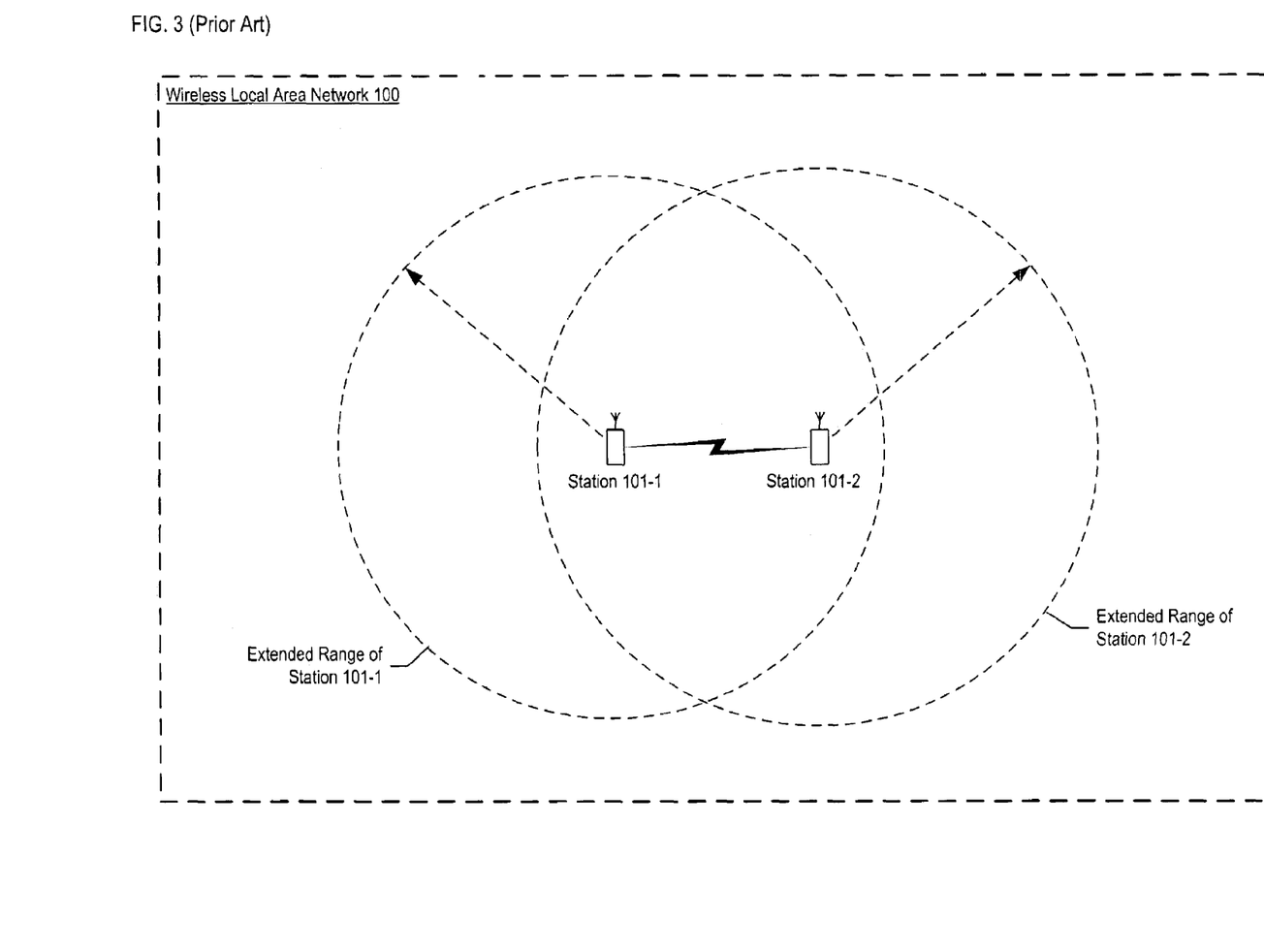
FIG. 3 depicts a schematic diagram of wireless local area network 100, as shown in FIG. 2, in the prior art, in which station 101-1 and station 101-2, as shown in FIG. 2, have extended transmission ranges.

Communicating stations 101-1 and 101-2 typically can compensate for the increase in transmission errors by extending their transmission ranges, as depicted in FIG. 3. As is well-known in the art, transmission range can be extended by decreasing the transmission bit rate. By extending the transmission range as shown in FIG. 3, the transmission error rate can revert to its prior lower level.

SUMMARY OF THE INVENTION

The present invention enables a station to address the increases and decreases in transmission errors experienced by a radio whose transmissions are periodically or sporadically obliterated by the transmissions of another radio. In particular, the illustrative embodiment addresses a problem that can occur when, for example, a wireless station employs both an IEEE 802.11 radio and a Bluetooth radio.

In accordance with the illustrative embodiment, the frame error rate of the IEEE 802.11 radio can increase due to either (i) fading, or (ii) interference between the Bluetooth and IEEE 802.11 radios, or both i and ii. If an increase in the IEEE 802.11 radio's frame error rate is due solely to fading, the typical remedy in the prior art is to lower the transmission bit rate. In contrast, if the increase in frame error rate is due to interference with the Bluetooth radio, the appropriate remedy is not to lower the transmission bit rate, but rather to decrease the likelihood that a particular frame will not be obliterated by the transmissions of another radio. In general, the probability that a frame will be obliterated by the transmissions of another radio are dependent, as least in part, on the length of the frame. Therefore, the likelihood that a particular frame will be obliterated by the transmissions of another radio can be reduced by shortening the length—or fragmentation threshold—of the IEEE 802.11 frames.

When the frame error rate of the IEEE 802.11 radio increases, however, the question arises as to whether the increase is due to fading or due to interference from the Bluetooth radio. The illustrative embodiment of the present invention distinguishes between these two causes by ascertaining characteristics of (i) the quality of signals (e.g., acknowledgement frames, etc.) from the remote IEEE 802.11 station, and (ii) the statistical character of the frame errors (e.g., the error rate, trends in the error rate, the distribution of errors over time, etc.) By intelligently analyzing (i) and (ii), the illustrative embodiment of the present invention can estimate whether the rise in the frame error rate is due to fading or to Bluetooth interference and then take the appropriate corrective action. In the case of transmission errors due to Bluetooth interference, the appropriate corrective action is to reduce the fragmentation threshold, which imposes a maximum length on IEEE 802.11 frames.

In this specification, the illustrative embodiment is disclosed in the context of IEEE 802.11 and Bluetooth protocols; however, it will be clear to those skilled in the art how to make and use alternative embodiments of the present invention for other combinations of competing protocols (i.e., protocols that might interfere with each other). In addition, although the illustrative embodiment is disclosed in the context of radios, it will be clear to those skilled in the art how to make and use alternative embodiments of the present invention for non-RF wireless radios and/or wireline transceivers that might interfere with each other.

The illustrative embodiment comprises: a transmitter for: transmitting a first plurality of frames to a destination in accordance with a first transmission bit rate, a first fragmentation threshold, and an error-correction mechanism, and transmitting a second plurality of frames to said destination in accordance with a second transmission bit rate, a second fragmentation threshold, and said error-correction mechanism; a receiver for receiving a signal; and a processor for setting said second transmission bit rate based on: a measure of quality of said signal, and a measure of activity of said error-correction mechanism with respect to said first plurality of frames.

DETAILED DESCRIPTION

Figure 4:
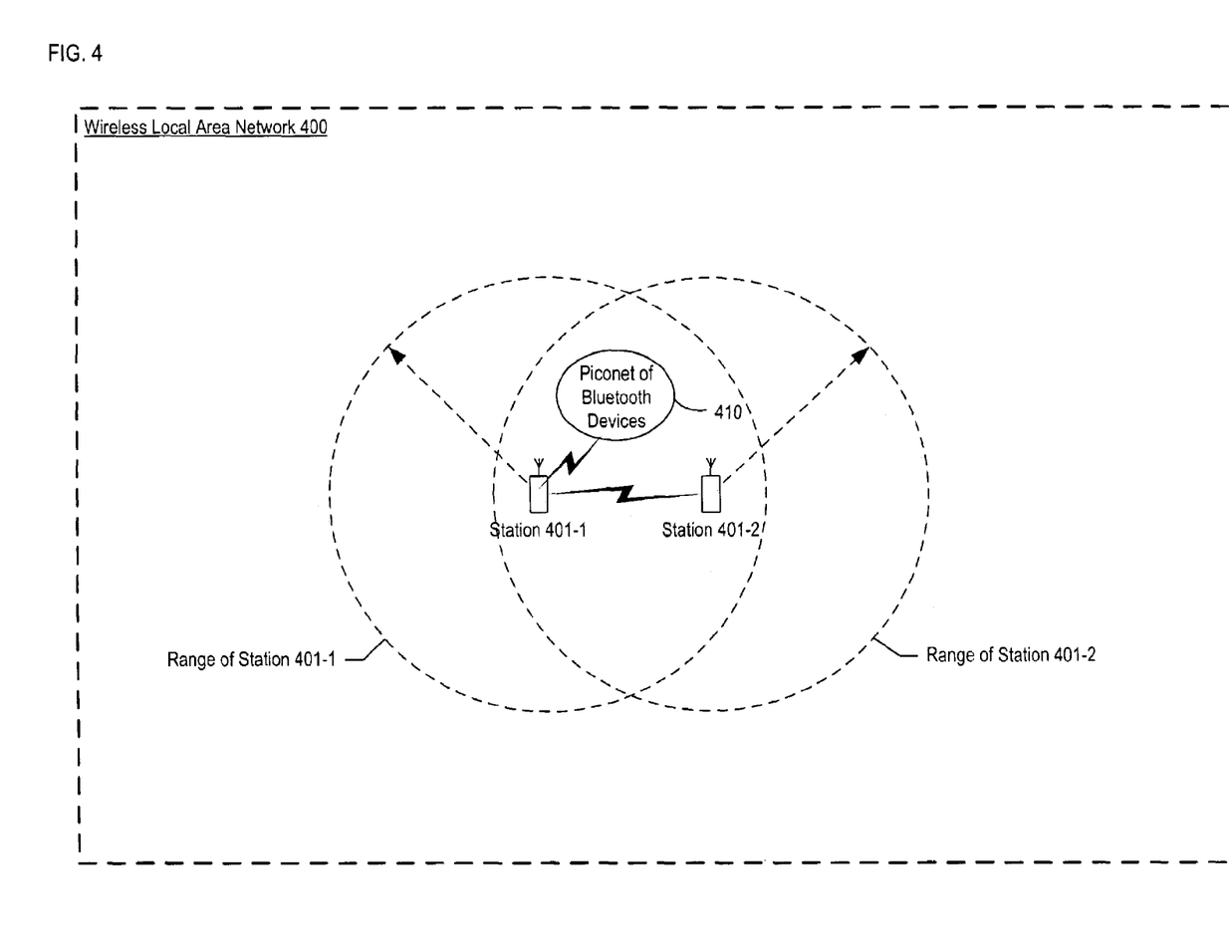
FIG. 4 depicts a schematic diagram of wireless local area network 100, as shown in FIG. 1, in accordance with the illustrative embodiment of the present invention, in which station 101-1, as shown in FIG. 1, also belongs to a Bluetooth piconet.

FIG. 4 depicts a schematic diagram of wireless LAN 400, in accordance with the illustrative embodiment of the present invention. Wireless station 401-1 comprises an IEEE 802.11 radio (not shown) for communicating with wireless station 401-2, as well as a Bluetooth radio (not shown) for communicating with devices in Bluetooth piconet 410.

Figure 5:
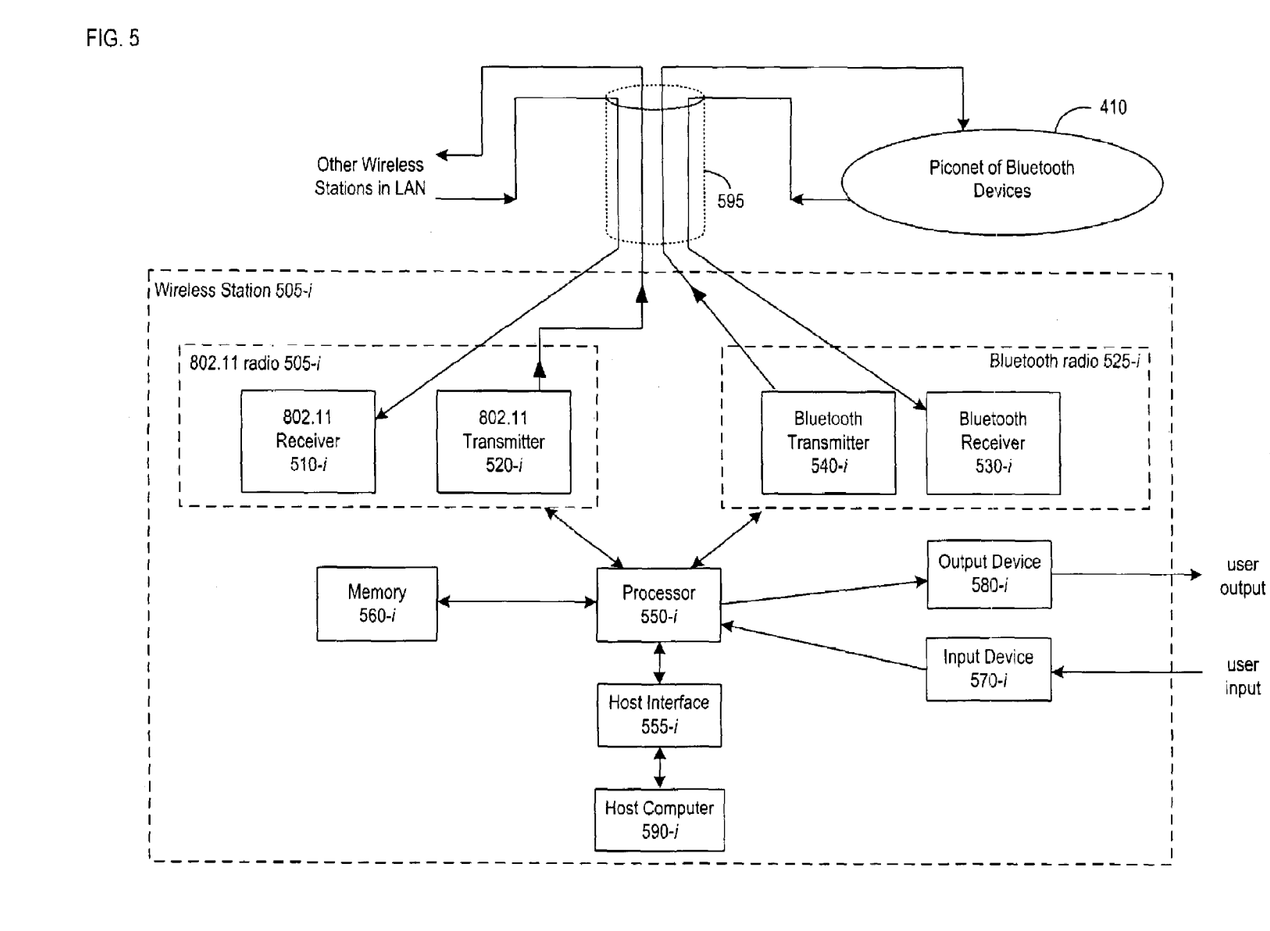
FIG. 5 depicts a schematic diagram of the salient components of wireless station 101-*i*, as shown in FIG. 4, in accordance with the illustrative embodiment of the present invention.

FIG. 5 depicts a schematic diagram of the salient components of wireless station 101-*i*, as shown in FIG. 4, in accordance with the illustrative embodiment of the present invention. As shown in FIG. 5, wireless station 101-*i* comprises IEEE 802.11 radio 505-*i*, Bluetooth radio 525-*i*, processor 550-*i*, host interface 555-*i*, memory 560-*i*, input device 570-*i*, output device 580-*i*, and host computer 590-*i*.

IEEE 802.11 radio 505-*i* comprises IEEE 802.11 receiver 510-*i* and IEEE 802.11 transmitter 520-*i*, and communicates with other wireless stations in well-known fashion via shared-communications band 595, as shown in FIG. 5.

IEEE 802.11 receiver 510-*i* is a hybrid analog and digital circuit that is capable of receiving IEEE 802.11 frames from the shared-communications band 595 and relaying them to processor 550-*i*. It will be clear to those skilled in the art, after reading this disclosure, how to make and use IEEE 802.11 receiver 510-*i*.

IEEE 802.11 transmitter 520-*i* is a hybrid analog and digital circuit that is capable of receiving frames from processor 550-*i* and of transmitting them into shared-communications band 595 at times in accordance with IEEE 802.11. It will be clear to those skilled in the art, after reading this disclosure, how to make and use IEEE 802.11 transmitter 520-*i*.

Bluetooth radio 525-*i* comprises Bluetooth receiver 530-*i* and Bluetooth transmitter 540-*i*, and communicates with other Bluetooth devices in piconet 410 in well-known fashion via shared communications band 595, as shown in FIG. 5.

Bluetooth receiver 530-*i* is a hybrid analog and digital circuit that is capable of receiving Bluetooth packets from the shared-communications band 595 and relaying them to processor 550-*i*. It will be clear to those skilled in the art, after reading this disclosure, how to make and use Bluetooth receiver 530-*i*.

Bluetooth transmitter 540-*i* is a hybrid analog and digital circuit that is capable of receiving frames from processor 550-*i* and of transmitting them into shared-communications band 595 at times in accordance with the Bluetooth protocol. It will be clear to those skilled in the art, after reading this disclosure, how to make and use Bluetooth transmitter 540-*i*.

Processor 550-*i* is a general-purpose processor that is capable of executing instructions stored in memory 560-*i*, of reading data from and writing data into memory 560-*i*, of controlling IEEE 802.11 radio 505-*i* and Bluetooth radio 525-*i* in well-known fashion, and of executing the tasks described below and with respect to FIGS. 7 and 8. In some alternative embodiments of the present invention, processor 550-*i* is a special-purpose processor. In either case, it will be clear to those skilled in the art, after reading this disclosure, how to make and use processor 550-*i*.

Host interface 555-*i* is a circuit that is capable of receiving data and instructions from host computer 590-*i* and of relaying them to processor 550-*i*. Furthermore, host interface 555-*i* is capable of receiving data and instructions from processor 550-*i* and relaying them to the host computer. It will be clear to those skilled in the art how to make and use host interface 555-*i*.

Memory 560-*i* is a non-volatile random-access memory that stores instructions and data for processor 550-*i*. It will be clear to those skilled in the art how to make and use memory 560-*i*.

Input device 570-*i* accepts user input and sends the input to processor 550-*i* in well-known fashion. As is well-known in the art, input device 570-*i* can take a variety of forms, such as a keyboard, pressure-sensitive touchscreen, etc.

Output device 580-*i* receives a signal from processor 550-*i* and generates an output signal based on the received signal in well-known fashion. As is well-known in the art, output device 580-*i* can generate one or more kinds of signals (e.g., auditory, visual, tactile, etc.) and can take a variety of forms (e.g., one or more light-emitting diodes (LEDs), a speaker, etc.).

Host computer 590-*i* is a computer that comprises a processor, memory, and user interface (e.g., display, keyboard, keypad, etc.) for interacting with a user. It will be clear to those skilled in the art how to make and use host computer 590-*i*.

Figure 6:
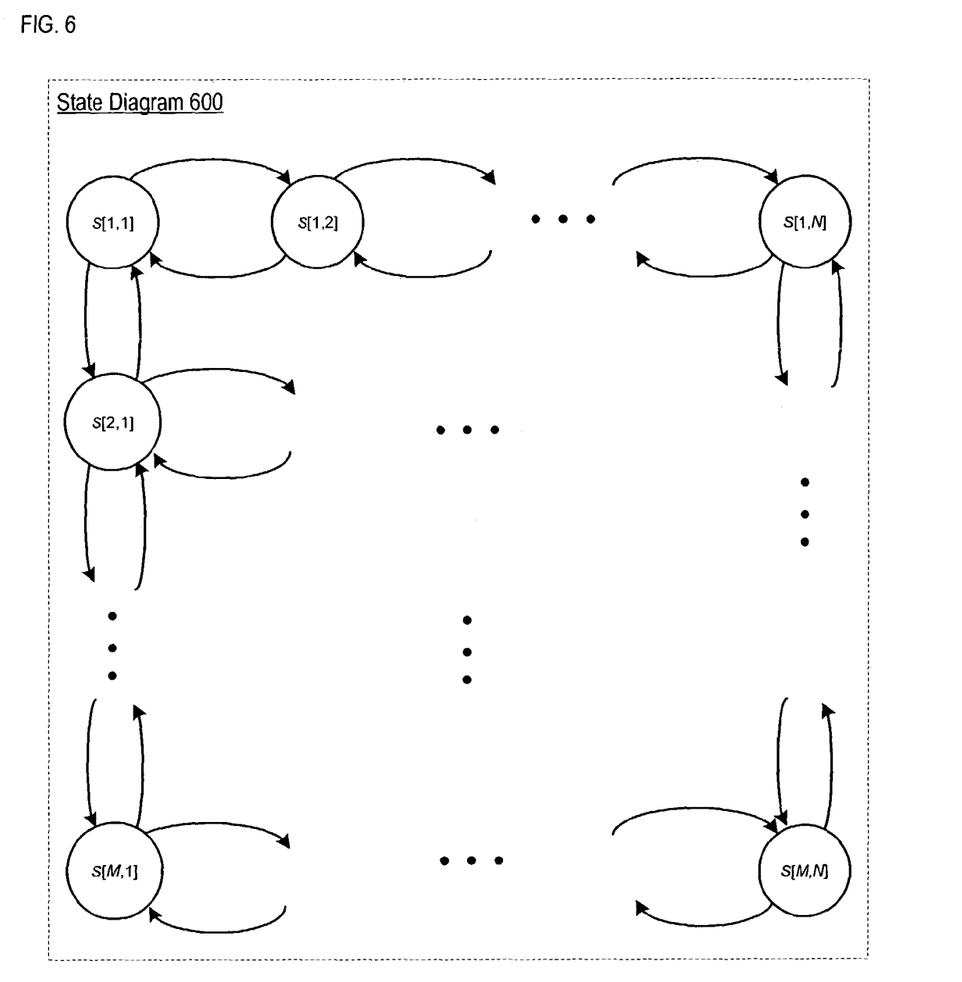
FIG. 6 depicts a state diagram for wireless station 101-*i*, as shown in FIG. 5, in accordance with the illustrative embodiment of the present invention.

FIG. 6 depicts state diagram 600 for wireless station 101-*i*, as shown in FIG. 5, in accordance with the illustrative embodiment of the present invention. As shown in FIG. 6, state diagram 600 comprises states $\{s[m, n]\}$, where: m is an integer between 1 and M; n is an integer between 1 and N; M is a positive integer; and N is a positive integer. Possible transitions between states $s[m, n]\}$ are as indicated by the arcs in FIG. 6.

Each state in column n (i.e., states $s[1, n]$ through $s[M, n]$) has an associated transmission bit rate $r[n]$. Transmission bit rate $r[n]$ is monotonically decreasing (i.e., $r[1] > r[2] > \ldots > r[N]$); thus a transition "right" from a state $s[m, n]$ to state $s[m, n+1]$, for all $1 \leq m \leq M$ and $1 \leq n \leq N-1$, represents a decrease in transmission bit rate. Similarly, a transition "left" from state $s[m, n]$ to state $s[m, n-1]$, for all $1 \leq m \leq M$ and $2 \leq n \leq N$, represents an increase in transmission bit rate.

Each state in row m (i.e., states $s[m, 1]$ through $s[m, N]$) has an associated fragmentation threshold $t[m]$. Fragmentation threshold $t[m]$ is monotonically decreasing (i.e., $t[1] > t[2] > \ldots > t[M]$); thus a transition "down" from a state $s[m, n]$ to state $s[m+1, n]$, for all $1 \leq m \leq M-1$ and $1 \leq n \leq N$, represents a decrease in fragmentation threshold. Similarly, a transition "up" from state $s[m, n]$ to state $s[m-1, n]$, for all $2 \leq m \leq M$ and $1 \leq n \leq N$, represents an increase in fragmentation threshold.

It will be clear to those skilled in the art that a variety of different of values can be chosen for M and N (e.g., M=N=3, corresponding to "low," "medium," and "high" values for both fragmentation threshold and transmission bit rate, etc.), as well as for the values of vectors r and t (e.g., for N=4, transmission bit rates of 11 mbps, 5.5 mbps, 2 mbps, and 1 mbps, etc.). Furthermore, in some embodiments the values of vectors r and t might be "tunable" parameters, as is well understood in the art.

In the illustrative embodiment of the present invention, wireless station 101-*i* begins in state s[1, 1], which corresponds to maximum transmission bit rate (i.e., r[1]) and maximum fragmentation threshold (i.e., t[1]). State s[1, 1] represents the most "aggressive" state in that, in the absence of fading and interference, maximum throughput is achieved. If either fading or interference occurs, however, it is typically advantageous to enter another state (i.e., decrease transmission bit rate or the fragmentation threshold, respectively) to mitigate the resultant increase in transmission errors. How the illustrative embodiment distinguishes between fading and interference, as well as the resultant state transitions and actions performed for each case, are disclosed below and with with respect to FIGS. 7 and 8.

Figure 7:
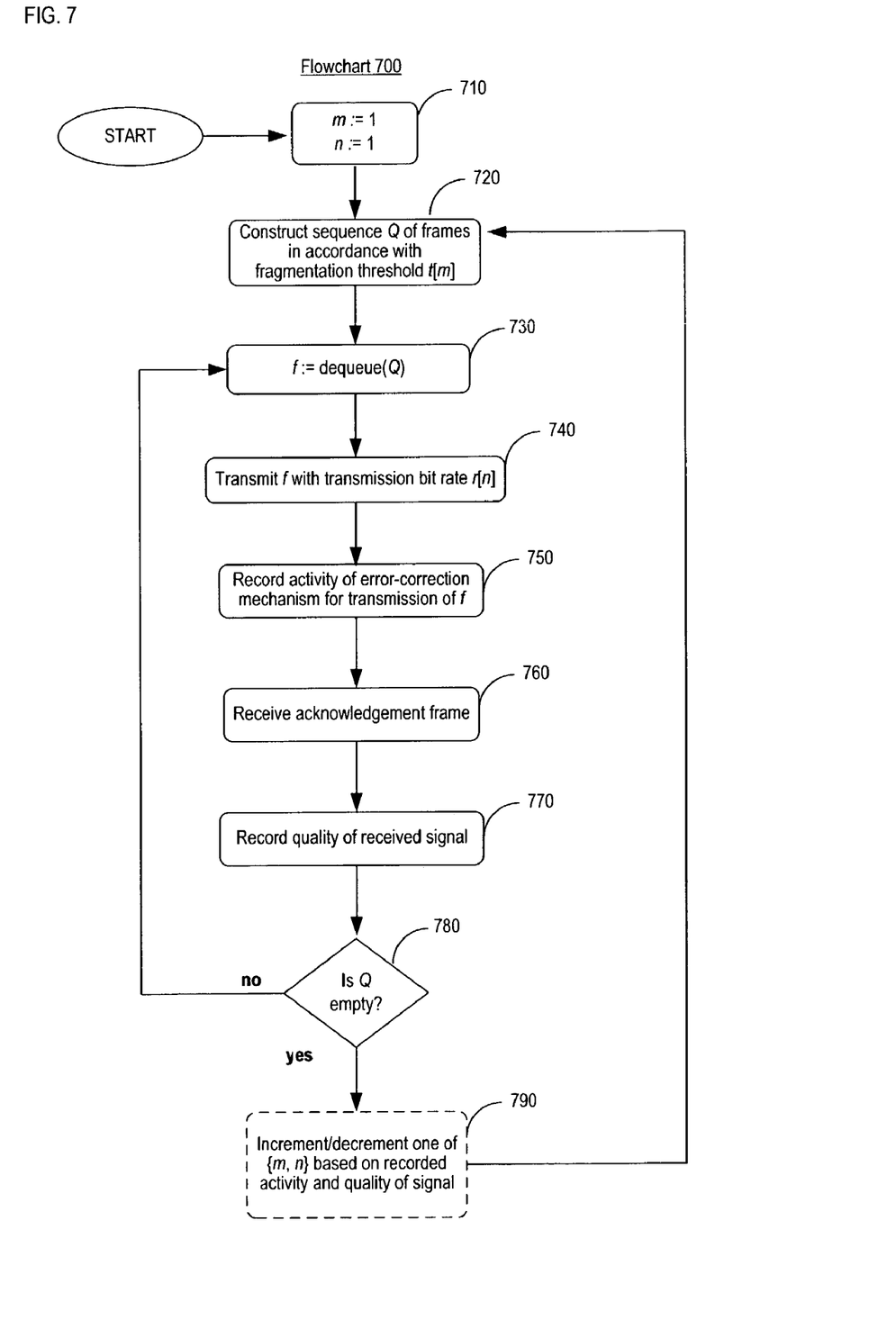
FIG. 7 depicts a flowchart of the operation of wireless station 101-*i*, as shown in FIG. 5, in accordance with the illustrative embodiment of the present invention.

FIG. 7 depicts flowchart 700 of the operation of wireless station 101-*i* in accordance with the illustrative embodiment of the present invention.

At task 710, variables m and n are both initialized to a value of 1.

At task 720, a sequence Q of IEEE 802.11 frames ready for transmission is constructed in accordance with fragmentation threshold t[m], in well-known fashion.

At task 730, the first frame of Q is removed and stored in variable f, in well-known fashion.

At task 740, IEEE 802.11 frame f is transmitted in accordance with transmission bit rate r[n], in well-known fashion.

At task 750, IEEE 802.11 error-correction activity (e.g., the number of retries, etc.) for transmission of frame f is recorded.

At task 760, an IEEE 802.11 acknowledgement frame is received for frame f, as is well understood in the art.

At task 770, the signal quality (e.g., strength in dBm, signal-to-noise ratio, etc.) for the received acknowledgement frame is recorded.

Task 780 checks whether sequence Q of frames is empty. If so, execution proceeds to task 790; otherwise, execution goes back to task 730.

At task 790, one of variables {m, n} is incremented or decremented based on the error-correction activity for sequence Q recorded at task 750, and the signal quality recorded for sequence Q at task 770. This increment/decrement effectively causes a state transition as described above for FIG. 6. Details concerning the logic of task 790 are disclosed below and with respect to FIG. 8.

Figure 8:
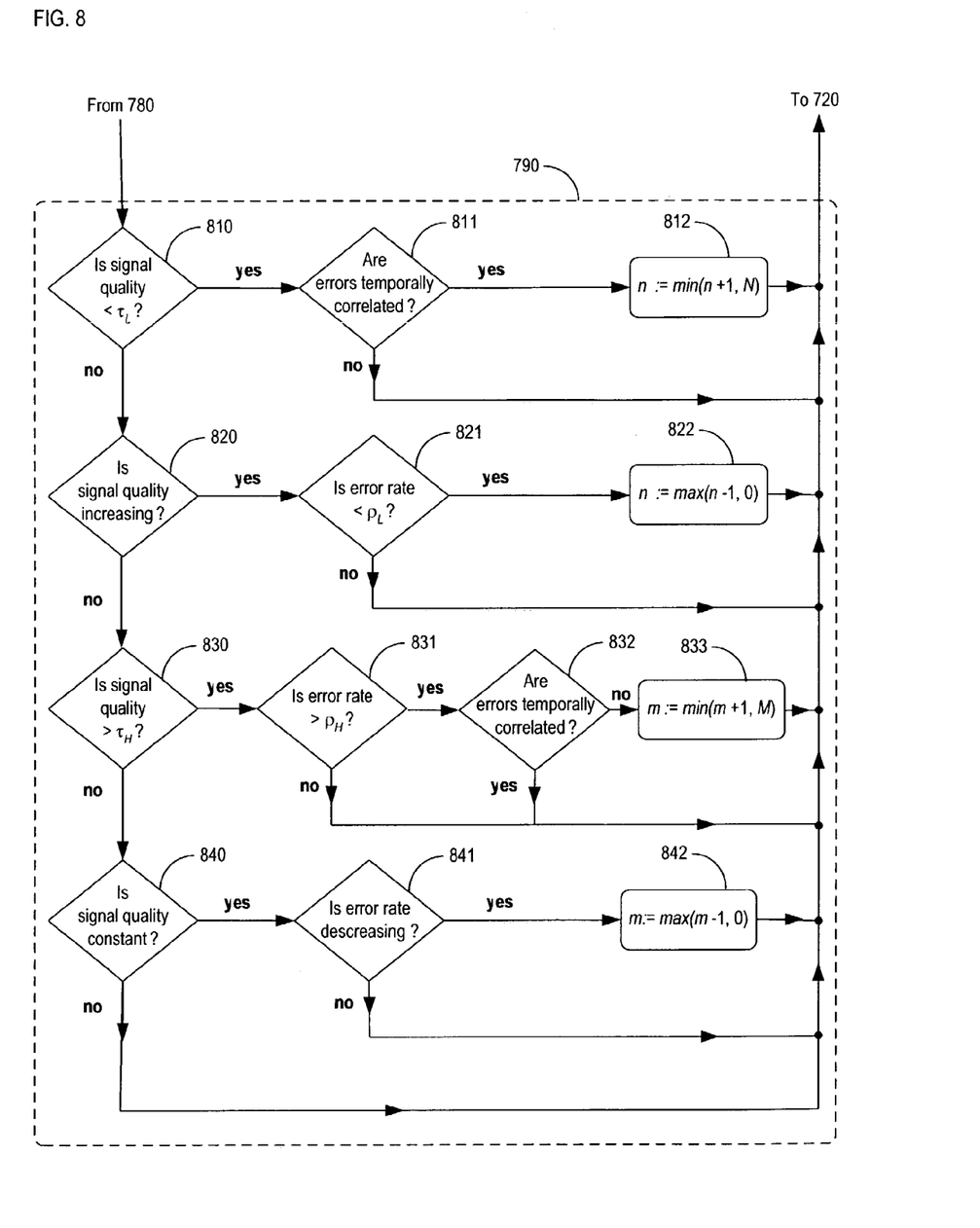
FIG. 8 depicts a detailed flowchart of task 790, as shown in FIG. 7, in accordance with the illustrative embodiment of the present invention.

FIG. 8 depicts a detailed flowchart of task 790 in accordance with the illustrative embodiment of the present invention.

At task 810, the signal quality recorded for sequence Q at task 770 is compared to a low-signal-quality threshold $\tau_L$. If the signal quality is below threshold $\tau_L$, execution proceeds to task 811; otherwise, execution proceeds to task 820.

At task 811, the error-correction activity for sequence Q (recorded at task 750) is examined. If the transmission errors for sequence Q of frames are temporally correlated, then execution proceeds to task 812; otherwise, execution proceeds to task 821. For the purposes of this specification, the term "temporally correlated" is defined as the occurrence of transmission errors does not follow a Poisson distribution (i.e., errors are non-Markov), as is well-understood in the art. Intuitively, this means that transmission errors are not "random" in nature (e.g., they are bursty, periodic, etc.). Similarly, for the purposes of this specification, the term "temporally uncorrelated" is defined as the occurrence of transmission errors does follow a Poisson distribution.

At task 812, the illustrative embodiment of the present invention concludes that fading is occurring. Variable n is incremented by 1 when n<N (i.e., the transmission bit rate is lowered for the next frame sequence); otherwise n remains unchanged with value N (i.e., the minimum transmission bit rate has already been reached). Execution then proceeds to task 720, as disclosed in FIG. 7.

At task 820, the trend in signal quality (recorded at task 770) is examined. If signal quality is increasing, execution proceeds to task 821; otherwise, execution proceeds to task 830. As will be appreciated by those skilled in the art, determining the trend in signal quality can be based on a variety of methods (e.g., a linear moving average, an exponential moving average, etc.) and a variety of time windows (e.g., sequence Q only, the last K sequences, a fixed number of seconds, a fixed number of frames, etc.).

At task 821, the error rate for sequence Q is compared to a low-error-rate threshold PL. If the error rate is below threshold PL, execution proceeds to task 822; otherwise, execution proceeds to task 720, as disclosed in FIG. 7.

At task 822, the illustrative embodiment of the present invention concludes that RF conditions are improving. Variable n is decremented by 1 when n>1 (i.e., the transmission bit rate is raised for the next frame sequence); otherwise n remains unchanged with value 1 (i.e., the maximum transmission bit rate has already been reached). Execution then proceeds to task 720, as disclosed in FIG. 7.

At task 830, the signal quality recorded for frame sequence Q at task 770 is compared to a high-signal-quality threshold $\tau_H$. If the signal quality exceeds threshold $\tau_H$, execution proceeds to task 831; otherwise, execution proceeds to task 840.

At task 831, the error rate for sequence Q is compared to a high-error-rate threshold $\rho_H$. If the error rate exceeds threshold $\rho_H$, execution proceeds to task 832; otherwise, execution proceeds to task 720, as disclosed in FIG. 7.

At task 832, the error-correction activity for sequence Q (recorded at task 750) is examined. If the transmission errors for sequence Q are temporally uncorrelated, then execution proceeds to task 833; otherwise, execution proceeds to task 720, as disclosed in FIG. 7.

At task 833, the illustrative embodiment of the present invention concludes that Bluetooth interference is occurring. Variable m is incremented by 1 when m<M (i.e., the fragmentation threshold is lowered for the next frame sequence); otherwise m remains unchanged with value M (i.e., the minimum fragmentation threshold has already been reached). Execution then proceeds to task 720, as disclosed in FIG. 7.

At task 840, the trend in signal quality is examined. If signal quality has remained constant, execution proceeds to task 841; otherwise, execution proceeds to task 720, as disclosed in FIG. 7. As will be appreciated by those skilled in the art, a "constant" signal quality can be defined as meaning that signal quality over a particular time interval varies by no more than a signal-quality-variability threshold or X%, where X is chosen judicially (e.g., 15%, etc.). It will also be appreciated by those skilled in the art that determining whether the signal quality is constant can be based on a variety of time intervals (e.g., sequence Q only, the last K frame sequences, a fixed number of seconds, a fixed number of frames, etc.).

At task 841, the trend in error rate is examined. If the error rate has been decreasing, execution proceeds to task 842; otherwise, execution proceeds to task 720, as disclosed in FIG. 7. As described above, the trend in error rate can be based on a variety of time windows and determined by a variety of methods.

At task 842, the illustrative embodiment of the present invention concludes that Bluetooth interference has lessened, or stopped altogether. Variable m is decremented by 1 when m>1 (i.e., the fragmentation threshold is raised for the next frame sequence); otherwise m remains unchanged with value 1 (i.e., the maximum fragmentation threshold has already been reached). Execution then proceeds to task 720, as disclosed in FIG. 7.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
    a transmitter for:
        transmitting a first plurality of frames to a destination in accordance with a first transmission bit rate, a first fragmentation threshold, and an error-correction mechanism, and
        transmitting a second plurality of frames to said destination in accordance with a second transmission bit rate, a second fragmentation threshold, and said error-correction mechanism;
    a receiver for receiving a signal in response to said first plurality and second plurality of frames; and
    a processor for setting said second transmission bit rate based on:
        a measure of quality of said signal, and
        a measure of activity of said error-correction mechanism with respect to said first plurality of frames, wherein said measure of activity of said error-correction mechanism with respect to said first plurality of frames is based on the temporal correlation of frame errors for said first plurality of frames.

2. The apparatus of claim 1 wherein said second transmission bit rate is also based on said first transmission bit rate.

3. The apparatus of claim 1 wherein said error-correction mechanism is automatic-repeat-request.

4. The apparatus of claim 1 wherein said error-correction mechanism is forward-error correction.

5. The apparatus of claim 1 wherein said processor is also for setting said second fragmentation threshold based on said measure of quality of said signal.

6. The apparatus of claim 5 wherein said second fragmentation threshold is also based on said measure of activity of said error-correction mechanism with respect to said first plurality of frames.

7. The apparatus of claim 5 wherein said second fragmentation threshold is also based on said first fragmentation threshold.

8. The apparatus of claim 1 wherein said processor is also for setting said second fragmentation threshold based on said measure of activity of said error-correction mechanism with respect to said first plurality of frames.

9. The apparatus of claim 1 wherein said measure of activity of said error-correction mechanism with respect to said first plurality of frames is further based on the rate of frame errors for said first plurality of frames.

10. The apparatus of claim 1 wherein said processor is also for:
    generating said first plurality of frames from a first data unit whose length exceeds said first fragmentation threshold; and
    generating said second plurality of frames from a second data unit whose length exceeds said second fragmentation threshold.

11. An apparatus comprising:
    a transmitter for:
        transmitting a first plurality of frames to a destination in accordance with a first transmission bit rate and an error-correction mechanism, wherein a respective length of each of said first plurality of frames is no greater than a first fragmentation threshold, and
        transmitting a second plurality of frames to said destination in accordance with a second transmission bit rate and said error-correction mechanism, wherein a respective length of each of said second plurality of frames is no greater than a second fragmentation threshold;
    a receiver for receiving a signal in response to said first plurality and second plurality of frames; and
    a processor configured to determine whether a frame error rate is due to fading or interference, the processor for setting said second fragmentation threshold based on:
        a measure of quality of said signal, and
        a measure of activity of said error-correction mechanism with respect to said first plurality of frames; wherein the activity of said first plurality of frames is based on the temporal correlation of the frame errors.

12. The apparatus of claim 11 wherein said second fragmentation threshold is also based on said first fragmentation threshold.

13. The apparatus of claim 11 wherein said error-correction mechanism is automatic-repeat-request.

14. The apparatus of claim 11 wherein said error-correction mechanism is forward-error correction.

15. The apparatus of claim 11 wherein said processor is also for setting said second transmission bit rate based on said measure of quality of said signal.

16. The apparatus of claim 15 wherein said second transmission bit rate is also based on said first transmission bit rate.

17. The apparatus of claim 11 wherein said processor is also for setting said second transmission bit rate based on said measure of activity of said error-correction mechanism with respect to said first plurality of frames.

18. The apparatus of claim 17 wherein said second transmission bit rate is also based on said first transmission bit rate.

19. The apparatus of claim 11 wherein said measure of activity of said error-correction mechanism with respect to said first plurality of frames is further based on:
    the rate of frame errors for said first plurality of frames for said first plurality of frames.

20. The apparatus of claim 11 wherein said processor is also for:
    generating said first plurality of frames from a first data unit whose length exceeds said first fragmentation threshold; and
    generating said second plurality of frames from a second data unit whose length exceeds said second fragmentation threshold.

21. An apparatus comprising:
    a transmitter for transmitting a plurality of frames in accordance with a transmission bit rate and an error-correction mechanism, wherein a respective length of each of said frames is no greater than a fragmentation threshold;

a receiver for receiving one or more signals in response to said plurality of frames; and a processor:
  (i) for decreasing said transmission bit rate when
    (a) a measure of quality of said one or more signals is less than a low-signal-quality threshold, and
    (b) errors in the reception of said plurality of frames are temporally correlated; and
  (ii) for increasing said transmission bit rate when
    (a) a measure of quality of said one or more signals increases, and
    (b) a frame error rate of said plurality of frames is less than a low-error-rate threshold.

22. The apparatus of claim 21 wherein said error-correction mechanism is automatic-repeat-request.

23. The apparatus of claim 21 wherein said error-correction mechanism is forward-error correction.

24. The apparatus of claim 21 wherein said processor is also for generating said plurality of frames from a data unit whose length exceeds said fragmentation threshold.

25. The apparatus of claim 21 wherein said processor is:
  (iii) also for decreasing said fragmentation threshold when
    (a) said measure of quality of said one or more signals exceeds a high-signal-quality threshold, and
    (b) the frame error rate of said plurality of frames is greater than a high-error-rate threshold, and
    (c) the errors in the reception of said plurality of frames are temporally uncorrelated; and
  (iv) also for increasing said fragmentation threshold when
    (a) said measure of quality of said one or more signals varies by less than a signal-quality-variability threshold, and
    (b) the frame error rate of said plurality of frames decreases over said time interval.

26. An apparatus comprising:
a transmitter for transmitting a plurality of frames over a time interval in accordance with a transmission bit rate and an error-correction mechanism, wherein a respective length of each of said frames is no greater than a fragmentation threshold;

a receiver for receiving one or more signals over said time interval; and a processor for:
  (i) decreasing said fragmentation threshold when
    (a) a measure of quality of said one or more signals over said time interval exceeds a high-signal-quality threshold,
    (b) an error rate of said error-correction mechanism over said time interval exceeds a high-error-rate threshold, and
    (c) errors corresponding to said error-correction mechanism are temporally uncorrelated over said time interval; and
  (ii) increasing said fragmentation threshold when
    (a) said measure of quality of said one or more signals varies by less than 15% over said time interval, and
  (b) the error rate of said error-correction mechanism decreases over said time interval.

27. The apparatus of claim 26 wherein said error-correction mechanism is automatic-repeat-request.

28. The apparatus of claim 26 wherein said error-correction mechanism is forward-error correction.

29. The apparatus of claim 26 wherein said processor is also for generating said plurality of frames from a data unit whose length exceeds said fragmentation threshold.

* * * * *

UNITED STATES PATENT AND TRADEMARK OFFICE
CERTIFICATE OF CORRECTION

PATENT NO. : 7,388,903 B2 Page 1 of 1
APPLICATION NO. : 10/448184
DATED : June 17, 2008
INVENTOR(S) : Godfrey It is certified that error appears in the above-identified patent and that said Letters Patent is hereby corrected as shown below:

Column 7, line 39, delete "the" and replace with --a--.

Column 7, line 64, delete "the" and replace with --a--.

Column 8, line 29, delete "the" before temporal and replace with --a--.

Column 8, line 55, delete "the" and replace with --a--.

Column 10, line 2, delete "said" and replace with --a--.

Signed and Sealed this

Ninth Day of September, 2008

JON W. DUDAS
*Director of the United States Patent and Trademark Office*